US012783697B2

(12) United States Patent
Cheng et al.

(10) Patent No.: US 12,783,697 B2
(45) Date of Patent: Nov. 3, 2026

(54) DATA REGISTER ACCESS METHOD AND APPARATUS, READABLE STORAGE MEDIUM, AND ELECTRONIC DEVICE

(71) Applicant: BEIJING HORIZON INFORMATION TECHNOLOGY CO., LTD., Beijing (CN)

(72) Inventors: Shunli Cheng, Beijing (CN); Jianjun Li, Beijing (CN); Jing Li, Beijing (CN)

(73) Assignee: BEIJING HORIZON INFORMATION TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 18/637,802

(22) Filed: Apr. 17, 2024

(65) Prior Publication Data

US 2024/0354427 A1 Oct. 24, 2024

(30) Foreign Application Priority Data

Apr. 21, 2023 (CN) ......................... 202310440320.8

(51) Int. Cl.
*G06F 21/60* (2013.01)
*G06F 21/62* (2013.01)

(52) U.S. Cl.
CPC ........ *G06F 21/604* (2013.01); *G06F 21/6209* (2013.01)

(58) Field of Classification Search
CPC ............... G06F 21/604; G06F 21/6209; G06F 9/45558; G06F 2009/45579;
(Continued)

(56) References Cited

U.S. PATENT DOCUMENTS

2009/0006801 A1* 1/2009 Shultz .................. G06F 9/5016 711/170
2010/0088699 A1* 4/2010 Sasaki ....................... G06F 8/63 718/1
(Continued)

FOREIGN PATENT DOCUMENTS

JP 1986145646 U 9/1986
JP H07105029 A 4/1995
(Continued)

OTHER PUBLICATIONS

Japanese Decision to grant from corresponding Japanese patent application No. 2024-042275, mailed on Mar. 18, 2025 and its English translation.

(Continued)

*Primary Examiner* — Harunur Rashid
(74) *Attorney, Agent, or Firm* — K&L Gates LLP

(57) ABSTRACT

Disclosed are a data register access method, a computer readable storage medium and electronic device. The method includes: determining a first virtual machine identifier and first address of a to-be-accessed data register from a register access request generated by a target virtual machine; determining, based on the first virtual machine identifier, a target data register group and target protection register from at least two data register groups and a protection register group; determining an access permission of the target virtual machine to the target data register group using the target protection register; and determining, based on the first address, the to-be-accessed data register from the target data register group in response to that the access permission is access allowed, and accessing the to-be-accessed data register using the target virtual machine, whereby isolation between register groups is implemented on hardware,
(Continued)

improving efficiency of accessing the register by the virtual machine.

20 Claims, 5 Drawing Sheets

(58) Field of Classification Search
CPC ....... G06F 2009/45587; G06F 12/1416; G06F 21/53; G06F 2221/2141; Y02D 10/00
See application file for complete search history.

(56) References Cited

U.S. PATENT DOCUMENTS

| | | | | |
|---|---|---|---|---|
| 2012/0117614 | A1 * | 5/2012 | Sahita | G06F 9/45558 726/1 |
| 2015/0277949 | A1 * | 10/2015 | Loh | G06F 9/45558 718/1 |
| 2019/0361818 | A1 * | 11/2019 | Ichikawa | G06F 12/1458 |
| 2021/0049045 | A1 * | 2/2021 | Leng | G06F 9/5027 |

FOREIGN PATENT DOCUMENTS

| | | | |
|---|---|---|---|
| JP | 2010-532034 | A | 9/2010 |
| JP | 2019204382 | A | 11/2019 |
| JP | 2021028820 | A | 2/2021 |

OTHER PUBLICATIONS

Extended European Search Report from corresponding European Patent Application No. 24165905.1, mailed on Sep. 18, 2024.

* cited by examiner

DATA REGISTER ACCESS METHOD AND APPARATUS, READABLE STORAGE MEDIUM, AND ELECTRONIC DEVICE

RELATED APPLICATION INFORMATION

This application claims priority to and the benefit of Chinese patent application Ser. No. 202310440320.8 filed on Apr. 21, 2023, incorporated herein by reference.

FIELD OF THE INVENTION

This disclosure relates to the technical filed of computers, and in particular, to a data register access method and apparatus, a computer readable storage medium, and an electronic device.

BACKGROUND OF THE INVENTION

A virtual machine (VM) refers to a full computer system that is simulated through software, has full hardware system functionality, and is run in a completely isolated environment. All work that can be completed in a physical computer can be implemented in the virtual machine. On a same computer, a plurality of operating systems, such as Windows, DOS, and LINUX may be run simultaneously by using the virtual machine.

To ensure safe operation of software programs in different virtual machines, it is required that hardware resources are only in one software environment or virtual machine at a time. A register is an important storage resource in the hardware system. Therefore, it is very important in virtualization technologies to ensure access protection for registers of different virtual machines.

According to most of current virtualization technologies, access conflicts of the register are resolved from a perspective of software. For example, the register for access is controlled by setting a flag bit. Before the register is accessed by a virtual machine, the flag bit is first queried to confirm whether the virtual machine has a permission to write to the specified register. Instructions for accessing the register can only be sent when an access permission is owned. If there is no access permission, it is prohibited to send instructions.

SUMMARY OF THE INVENTION

A register accessing method used in a current virtualization technology requires software scheduling, which has disadvantages of high time consumption, slow access speed, and low work efficiency. How to improve access efficiency on the basis of implementing register access protection is a problem that currently needs to be resolved.

To resolve the foregoing technical problem, embodiments of this disclosure provide a data register access method and apparatus, a computer readable storage medium, and an electronic device, to achieve isolation between registers corresponding to different virtual machines, being flexible and efficient.

An embodiment of this disclosure provides a data register access method. The method includes: determining a first virtual machine identifier and a first address of a to-be-accessed data register from a register access request generated by a target virtual machine, wherein the first address indicates a position of the to-be-accessed data register in a target data register group to which the to-be-accessed data register belongs, and the to-be-accessed data register is a data register to be accessed; determining, based on the first virtual machine identifier, a target data register group and a target protection register that correspond to the target virtual machine from at least two preset data register groups and a preset protection register group; determining an access permission of the target virtual machine to the target data register group by using the target protection register; and determining, based on the first address, the to-be-accessed data register from the target data register group in response to that the access permission is access allowed, and accessing the to-be-accessed data register by using the target virtual machine.

According to another aspect of an embodiment of this disclosure disclose, a data register access apparatus is provided. The apparatus includes: a first determining module, configured to determine a first virtual machine identifier and a first address of a to-be-accessed data register from a register access request generated by a target virtual machine, wherein the first address indicates a position of the to-be-accessed data register in a target data register group to which the to-be-accessed data register belongs; a second determining module, configured to determine, based on the first virtual machine identifier, a target data register group and a target protection register that correspond to the target virtual machine from at least two preset data register groups and a preset protection register group; a third determining module, configured to determine an access permission of the target virtual machine to the target data register group by using the target protection register; and an access module, configured to determine, based on the first address, the to-be-accessed data register from the target data register group in response to that the access permission is access allowed, and access the to-be-accessed data register by using the target virtual machine.

According to another aspect of an embodiment of this disclosure, a computer readable storage medium is provided. The computer readable storage medium stores a computer program, and the computer program is used to be executed by a logic execution device to implement the foregoing data register access method.

According to another aspect of an embodiment of this disclosure, an electronic device is provided. The electronic device includes a logic execution device, a first preset quantity of data registers, a second preset quantity of protection registers, and an instruction memory, wherein the instruction memory is configured to store executable instructions which are executable by the logic execution device, and the logic execution device is configured to read the executable instructions from the instruction memory, and execute the instructions to implement the foregoing data register access method.

According to another aspect of an embodiment of this disclosure, a computer program product is provided. The computer program product includes computer program instructions for, when executed by a processor, implementing the data register access method provided in this disclosure.

According to the data register access method and apparatus, the computer readable storage medium, and the electronic device that are provided in the foregoing embodiments of this disclosure, a dedicated target data register group is disposed for the target virtual machine, and the access permission of the target virtual machine to the target data register group is controlled by using the target protection register, so that the target virtual machine can access only the corresponding target data register group. In this way, different virtual machines may be flexibly controlled to access respective corresponding data register groups. Isolation between register groups is implemented on hardware, without setting a complex software program to control the access permission of the virtual machine to the register, so that efficiency of accessing the register by the virtual machine is improved.

DETAILED DESCRIPTION OF THE EMBODIMENTS

To explain this disclosure, exemplary embodiments of this disclosure are described below in detail with reference to accompanying drawings. Obviously, the described embodiments are merely a part, rather than all of embodiments of this disclosure. It should be understood that this disclosure is not limited by the exemplary embodiments.

It should be noted that unless otherwise specified, the scope of this disclosure is not limited by relative arrangement, numeric expressions, and numerical values of components and steps described in these embodiments.

Application Overview

In existing technologies, access conflicts of a data register in a multi-virtual machine scenario are usually processed from a software perspective. Software is required to schedule access permissions for different virtual machines to the data register, having problems of high time consumption, slow access speed, and low work efficiency. To resolve this problem, a data register access method is provided in an embodiment of this disclosure. According to the method, a dedicated target data register group is disposed for a target virtual machine, and an access permission of the target virtual machine to the target data register group is controlled by using a target protection register. In this way, different virtual machines may be flexibly controlled to access respective corresponding data register groups. Isolation between register groups is implemented on hardware, without setting a complex software program to control an access permission of the virtual machine to the register, so that efficiency of accessing the register by the virtual machine is improved.

Exemplary System

Figure 1:
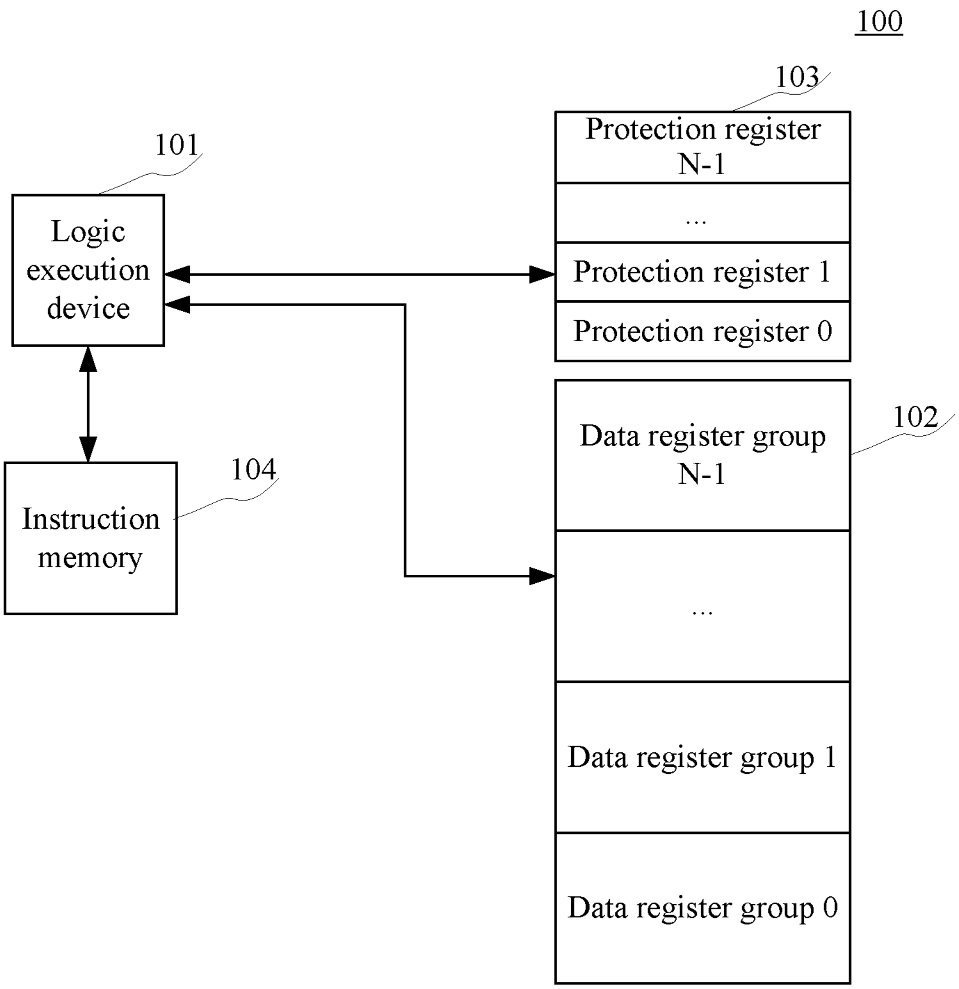
FIG. 1 is a diagram of a system to which this disclosure is applicable.

FIG. 1 illustrates an exemplary hardware system architecture 100 to which a data register access method or a data register access apparatus according to an embodiment of this disclosure may be applicable.

As shown in FIG. 1, the hardware system architecture 100 may include a logic execution device 101, a first preset quantity of data registers 102, a second preset quantity of protection registers 103, and an instruction memory 104.

The logic execution device 101 may include various types of devices for performing logic control functions. For example, the logic execution device 101 includes at least one of the following devices: a dedicated logic circuit designed through hardware description languages, a general-purpose microprocessor, and a microcontroller.

The first preset quantity of data registers 102 are configured to provide a data temporary storage function for at least two virtual machines. Generally, the first preset quantity of data registers 102 may include a plurality of data register groups. As shown in FIG. 1, the first preset quantity of data registers 102 include N data register groups (including a data register group 0, a data register group 1, . . . , and a data register group N−1). Each data register group corresponds to a virtual machine, and the virtual machine may use the corresponding data register group to perform data reading and writing.

The second preset quantity of protection registers 103 are configured to store data representing a correspondence between the virtual machine and the data register groups. For example, the protection register may store an identifier of the virtual machine. Each data register group corresponds to a protection register. As shown in FIG. 1, each of a protection register 0, a protection register1, . . . , and a protection register N−1 corresponds to a data register group, separately. The logic execution device 101 may read data from the protection register, and determine whether the virtual machine has an access permission to a to-be-accessed data register group based on the read data.

The instruction memory 104 is configured to store executable instructions which are executable by the logic execution device 101. The logic execution device 101 may read the executable instructions from the instruction memory, and execute the executable instructions to control access of the virtual machine to the data register group.

Optionally, the logic execution device 101 may include a processor and an access permission determining module. The processor may read the executable instructions from the instruction memory, and implement functions such as establishing correspondences between the data register group, the protection register, and the virtual machine. The permission determining module may include a dedicated circuit for implementing logical determining functions, to implement functions such as decoding a register access request, reading data representing the access permission of the target virtual machine from the protection register, and determining, based on the read data, whether a target virtual machine has an access permission to a target register group.

It should be noted that the data register access method provided in this embodiment of this disclosure is generally implemented by the logic execution device 101. Correspondingly, the data register access apparatus may be disposed in the logic execution device 101. The foregoing system architecture may be disposed in a same physical space, for example, in a system on chip (SOC); or it may be disposed in different physical spaces. For example, the logic execution device 101, the first preset quantity of data registers 102, the second preset quantity of protection registers 103, and the instruction memory 104 are disposed on different chips, respectively.

It should be understood that quantities of the logic execution device, the data registers, the protection registers, and the instruction memory in FIG. 1 are only for examples. According to implementation requirements, a quantity of logic execution devices 101, the first preset quantity of the data registers 102, the second preset quantity of the protection registers 103, and a quantity of instruction memories 104 may be any numbers.

Exemplary Method

Figure 2:
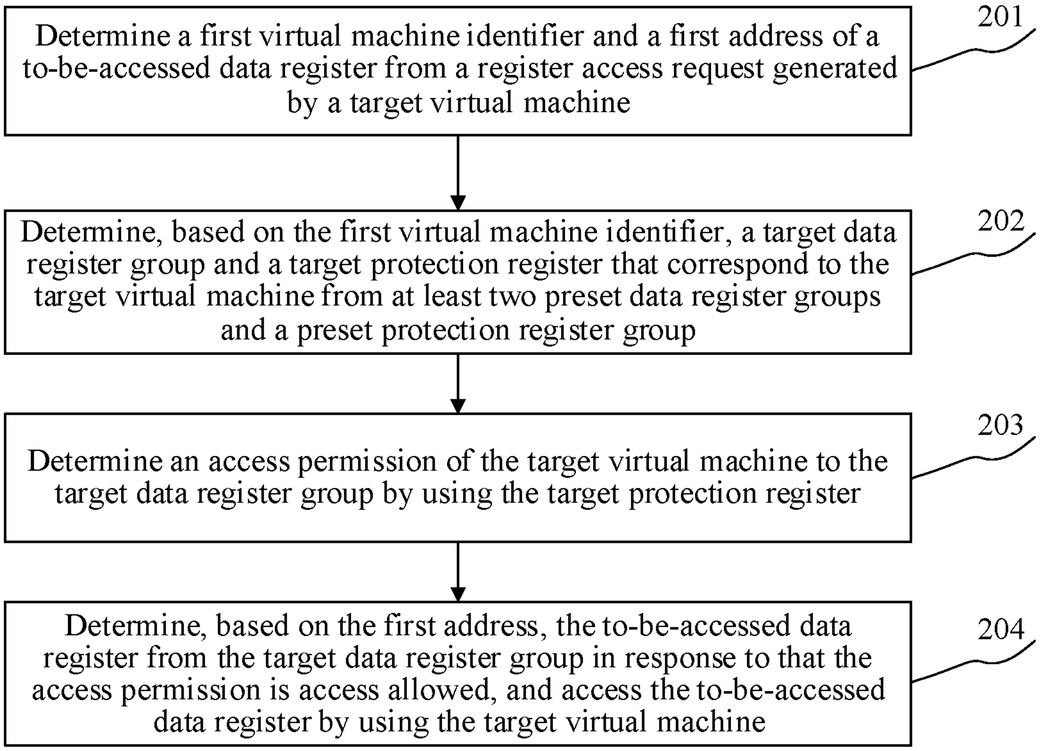
FIG. 2 is a schematic flowchart of a data register access method according to an exemplary embodiment of this disclosure.

FIG. 2 is a schematic flowchart of a data register access method according to an exemplary embodiment of this disclosure. This embodiment may be applicable to an electronic device (such as the logic execution device 101 shown in FIG. 1). As shown in FIG. 2, the method includes the following steps.

Step 201. Determine a first virtual machine identifier and a first address of a to-be-accessed data register from a register access request generated by a target virtual machine.

In this embodiment, the electronic device may determine the first virtual machine identifier and the first address of the to-be-accessed data register from the register access request generated by the target virtual machine.

The register access request may be a request generated by the target virtual machine before it accesses the data register. Usually, the register access request needs to be generated when the target virtual machine needs to write data to or read data from the to-be-accessed data register. The electronic device may extract the first virtual machine identifier (VMID) representing the target virtual machine and the first address of the to-be-accessed data register from the register access request. The first virtual machine identifier indicates the target virtual machine. To be specific, the target virtual machine needs to generate a respective virtual machine identifier before accessing a target data register group. The electronic device may determine the target data register group from at least two data register groups shown in FIG. 1 based on the first virtual machine identifier. The first virtual machine identifier may be any form of identifier; for example, it may include at least one of a number, a character, and a symbol.

The first address indicates a position of the to-be-accessed data register in the target data register group to which the to-be-accessed data register belongs. Optionally, the first address may be a relative address or an absolute address of the to-be-accessed data register. For example, if the absolute address of the to-be-accessed data register is m-bit binary data, the first address may be the m-bit binary data, or may be n lower bits of the m-bit binary data. The n lower bits are the relative address, and a numerical range of the n lower bits corresponds to a quantity of data registers in the target data register group.

Optionally, the register access request may also include the absolute address of the to-be-accessed data register. If the absolute address is m-bit binary data, m−n higher bits thereof may be a first register identifier, and n lower bits thereof may be the first address. To be specific, data with the m−n higher bits corresponds to a target data register group consisting of $2^n$ data register groups, and the first address is an address of the to-be-accessed data register in the $2^n$ data registers. In this way, the target data register group may be located in a first preset quantity of data registers 102 based on the first register identifier, and the to-be-accessed data register may be located in the target data register group based on the first address.

Step 202. Determine, based on the first virtual machine identifier, a target data register group and a target protection register that correspond to the target virtual machine from at least two preset data register groups and a preset protection register group.

In this embodiment, the electronic device may determine, based on the first virtual machine identifier, the target data register group and the target protection register that correspond to the target virtual machine from the at least two preset data register groups and the preset protection register group. The protection register group may be a register group consisting of at least two protection register groups in a second preset quantity of protection registers shown in FIG. 1.

Each protection register in the protection register group corresponds to a data register group; that is, it corresponds to a virtual machine. Correspondences between the protection register in the protection register group, the data register group and the virtual machine may be pre-established. For example, if addresses of the first preset quantity of data registers 102 and the second preset quantity of protection registers shown in FIG. 1 are arranged consecutively, an address offset corresponding to each data register group may be set sequentially based on an arrangement order of all the data register groups. The corresponding protection register may be determined based on the address offset. For another example, a correspondence table containing a first address of the data register group, an address of the corresponding protection register, and the virtual machine identifier may be pre-established. The target data register group and the target protection register that correspond to the target virtual machine may be determined according to the correspondence table.

Step 203. Determine an access permission of the target virtual machine to the target data register group by using the target protection register.

In this embodiment, the electronic device may determine the access permission of the target virtual machine to the target data register group by using the target protection register. The target protection register may store data representing the access permission of the target virtual machine to the target data register group.

For example, the target protection register may store a virtual machine identifier. If the virtual machine identifier is the same as the foregoing first virtual machine identifier, it is determined that the target virtual machine has the access permission to the target data register group. If the target data register group to be accessed by the target virtual machine is the data register group corresponding to another virtual machine, because the register access request generated by the target virtual machine needs to include the first virtual machine identifier representing the target virtual machine itself, the electronic device determines that the first virtual machine identifier is different from the virtual machine identifier stored in the protection register. In this case, it is determined that the target virtual machine does not have the access permission to the target data register group. For another example, the target protection register may store address data representing an address realm of the target data register group (such as high-bit-segment data of an address of each data register in the target data register group, where a quantity of bits in the high-bit-segment data is a preset value). When it is determined that an address of a data register to be accessed by the target virtual machine belongs to the address realm represented by the address data stored in the target protection register, it is determined that the target virtual machine has the access permission to the target data register group.

Optionally, after it is determined that the target virtual machine has the access permission to the target data register group, the electronic device may send an enable signal to the target data register group, so that a data read/write function of a target data register is enabled.

Step 204. Determine, based on the first address, the to-be-accessed data register from the target data register group in response to that the access permission is access allowed, and access the to-be-accessed data register by using the target virtual machine.

In this embodiment, the electronic device may determine, based on the first address, the to-be-accessed data register from the target data register group in response to that the access permission is access allowed.

The first address may be a relative address of the to-be-accessed data register in the target data register group. The to-be-accessed data register may be located in the target data register group based on the relative address. For example, the first address may be an ID from 0 to A-1, where A represents a quantity of data registers included in the target data register group.

Subsequently, the electronic device may access the to-be-accessed data register by using the target virtual machine. In other words, when running software, the target virtual machine performs a data read/write operation on the to-be-accessed data register.

According to the method provided in the foregoing embodiment of this disclosure, a dedicated target data register group is disposed for the target virtual machine, and the access permission of the target virtual machine to the target data register group is controlled by using the target protection register, so that the target virtual machine can access only the target data register group corresponding to the target virtual machine itself. In this way, different virtual machines may be flexibly controlled to access respective corresponding data register groups. Isolation between register groups is implemented on hardware, without setting a complex software program to control the access permission of the virtual machine to the register, so that efficiency of accessing the register by the virtual machine is improved.

Figure 3:
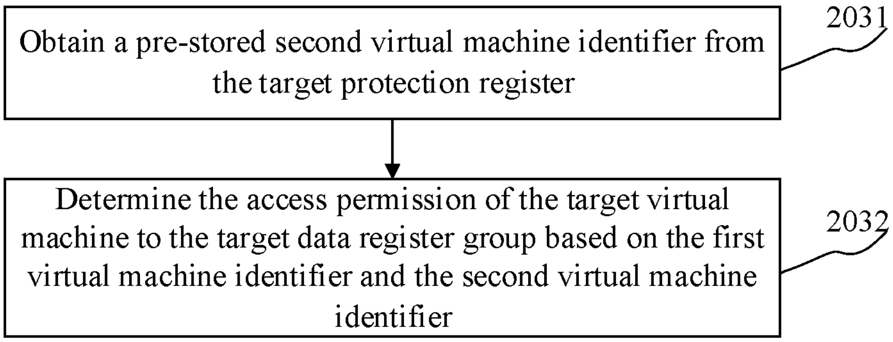
FIG. 3 is a schematic flowchart of a data register access method according to another exemplary embodiment of this disclosure.

In some optional implementations, as shown in FIG. 3, step 203 includes the following steps.

Step 2031. Obtain a pre-stored second virtual machine identifier from the target protection register.

The second virtual machine identifier represents a virtual machine corresponding to the target data register group; that is, it represents a virtual machine that may access the target data register group. For example, the second virtual machine identifier may be the high-bit-segment data of each data register included in the target data register group. For example, if the address of the data register is m-bit binary data-that is, the first preset quantity of data registers 102 have an address realm of [m−1: 0], the address realm is divided into two bit-segments, which are represented by using [m−1: n] and [n−1: 0]. If the bit-segment [m−1: n] is used to represent each data register group, and the bit-segment [n−1: 0] is used to represent a data register in each data register group, $(m-1)^{th}$-$n^{th}$ bits of addresses of all data registers included in the target data register group are all the same. Therefore, the $(m-1)^{th}$-$n^{th}$ bits of the address of each data register included in the target data register group may be used as the second virtual machine identifier.

Step 2032. Determine the access permission of the target virtual machine to the target data register group based on the first virtual machine identifier and the second virtual machine identifier.

Specifically, when the electronic device determines that the first virtual machine identifier and the second virtual machine identifier are the same, it is determined that the target virtual machine has the access permission to the target data register group. If the first virtual machine identifier and the second virtual machine identifier are different, the target virtual machine does not have the access permission to the target data register group.

In this embodiment, the first virtual machine identifier in the register access request is compared with the second virtual machine identifier stored in the target protection register, so as to determine whether the target virtual machine has the access permission to the target data register group. In this way, the access permission of the target virtual machine requesting access to the target data register group may be determined quickly and accurately, thereby helping to improve efficiency of accessing the data register in a multi-virtual machine environment.

Figure 4:
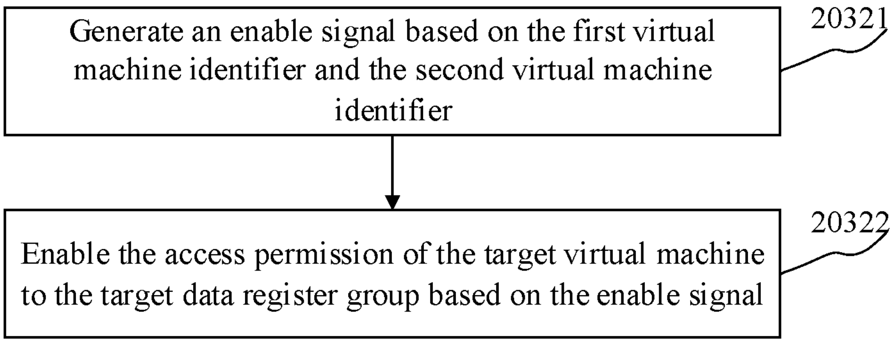
FIG. 4 is a schematic flowchart of a data register access method according to another exemplary embodiment of this disclosure.

In some optional implementations, as shown in FIG. 4, step 2032 includes the following steps.

Step 20321. Generate an enable signal based on the first virtual machine identifier and the second virtual machine identifier.

The enable signal may be a level signal (a high level or low level), or may be a digital signal containing multiple bits.

Step 20322. Enable the access permission of the target virtual machine to the target data register group based on the enable signal.

For example, the enable signal may be a low-level signal. To be specific, when the electronic device may determine that the target virtual machine has the access permission to the target data register group based on a comparison result of the first virtual machine identifier and the second virtual machine identifier (for example, the first virtual machine identifier and the second virtual machine identifier are the same), the electronic device lowers a level of an enable signal line connected to the target data register group. In this way, a read/write function of the target data register group is enabled, so that the target virtual machine may access the target data register.

According to this embodiment, the enable signal is generated to enable the access permission of the target virtual machine to the target data register group, so that the access permission of the target virtual machine to the target data register group may be controlled simply and flexibly.

In some optional implementations, step 2032 further includes:

- generating a disable signal in response to determining that the first virtual machine identifier and the second virtual machine identifier do not meet an authorization condition, and disabling the access permission of the target virtual machine to the target data register group based on the disable signal.

Referring to the foregoing example again, when the electronic device determines that the first virtual machine identifier and the second virtual machine identifier are different, it may be determined that the first virtual machine identifier and the second virtual machine identifier do not meet the authorization condition. In this case, a high level representing the disable signal may be generated to raise the level of the foregoing enable signal line, so as to disable the read/write function of the target data register group. Thus, the target virtual machine cannot access the target data register.

According to this embodiment, the target virtual machine is prohibited from accessing the target data register group when the target virtual machine does not have the access permission to the target data register group. This facilitates isolation of data register groups between different virtual machines, thereby avoiding conflicts between a plurality of virtual machines accessing the data registers.

Figure 5:
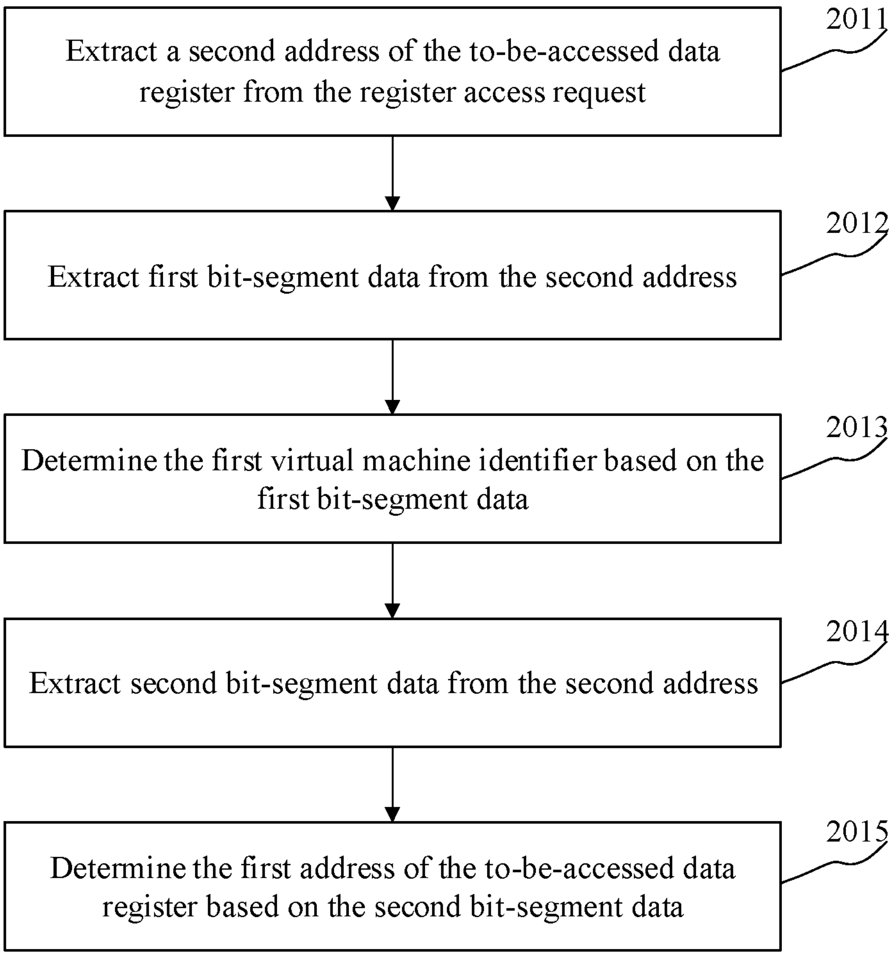
FIG. 5 is a schematic flowchart of a data register access method according to another exemplary embodiment of this disclosure.

In some optional implementations, as shown in FIG. 5, step 201 includes the following steps.

Step 2011. Extract a second address of the to-be-accessed data register from the register access request.

The second address may be the absolute address of the to-be-accessed data register. The absolute address refers to an address representing a position of the to-be-accessed data register in the first preset quantity of data registers 102 shown in FIG. 1.

Step 2012. Extract first bit-segment data from the second address.

The first bit segment data may be high-bit-segment data in the second address. For example, if the second address is m-bit binary data-that is, the first preset quantity of data registers 102 have an address realm of [m−1: 0], and the address realm is divided into two bit-segments, which are represented by using [m−1: n] and [n−1: 0], then the first bit-segment data may include data corresponding to the address realm [m−1: n].

Step 2013. Determine the first virtual machine identifier based on the first bit-segment data.

Generally, the first bit-segment data may be determined as the first virtual machine identifier. Optionally, a correspondence between the first bit-segment data and the first virtual machine identifier may also be pre-established. The first virtual machine identifier is determined based on the correspondence.

Step 2014. Extract second bit-segment data from the second address.

The second bit-segment data may be low-bit-segment data in the second address. Referring to the foregoing example again, the second bit-segment data may include data corresponding to the address realm [n−1: 0].

Step 2015. Determine the first address of the to-be-accessed data register based on the second bit-segment data.

Generally, the second bit-segment data may be determined as the first address. Optionally, a correspondence between the second bit-segment data and the first address may also be pre-established. The first address is determined based on the correspondence.

Referring to the foregoing example again, if the first bit-segment data with the address realm [m−1: n] is the first virtual machine identifier, the address realm may represent $2^{m-n}$ data register groups. If the address realm [n−1: 0] is the second bit-segment data, the address realm may indicate that each data register group includes $2^{n}$ data register groups.

According to this embodiment, the first virtual machine identifier and the first address are obtained by extracting the first bit-segment data and the second bit-segment data from the second address, so that the target data register group to which the data register to be accessed by the target virtual machine belongs is located quickly and accurately based on the address, and a position of the to-be-accessed data register in the target data register group is located quickly and accurately. This helps to improve determining of the access permission of the virtual machine to the data register.

Figure 6:
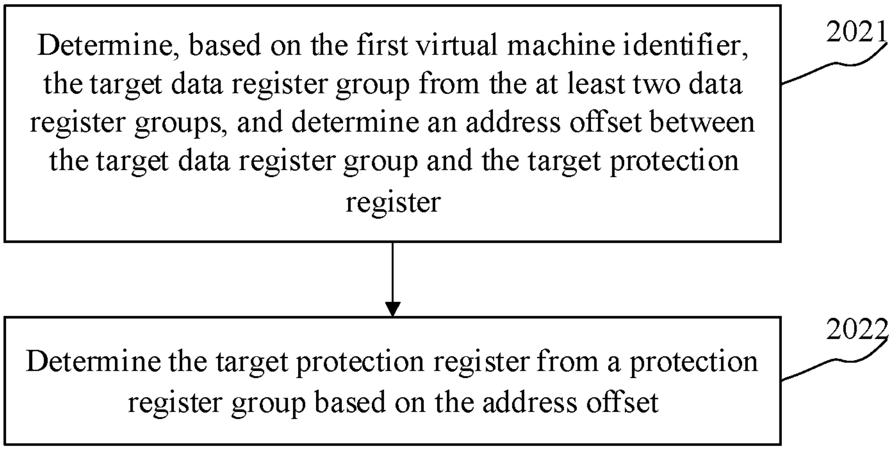
FIG. 6 is a schematic flowchart of a data register access method according to another exemplary embodiment of this disclosure.

In some optional implementations, as shown in FIG. 6, step 202 includes the following steps.

Step 2021. Determine, based on the first virtual machine identifier, the target data register group from the at least two data register groups, and determine an address offset between the target data register group and the target protection register.

Usually, the first preset quantity of data registers 102 and the second preset quantity of protection registers 103 shown in FIG. 1 are arranged consecutively. Therefore, an address offset corresponding to each data register group may be set when the protection register group corresponding to each data register group is pre-allocated. The protection register corresponding to the data register group may be located based on the address offset.

Optionally, a start address for the address offset may be a first address of the data register group, or may be a last address. The start address is added to the foregoing address offset to obtain the address of the corresponding protection register.

Step 2022. Determine the target protection register from the protection register group based on the address offset.

For example, a first address of the target data register group may be added to the address offset to obtain an address of the target protection register, so that the target protection register may be determined from the target data register group based on the address of the target protection register.

According to this embodiment, the address offset between the target data register group and the target protection register is determined, and the target protection register is determined based on the address offset. In this way, the target protection register is located quickly and accurately, which facilitates efficiency of determining the access permission of the target virtual machine to the target data register group.

Figure 7:
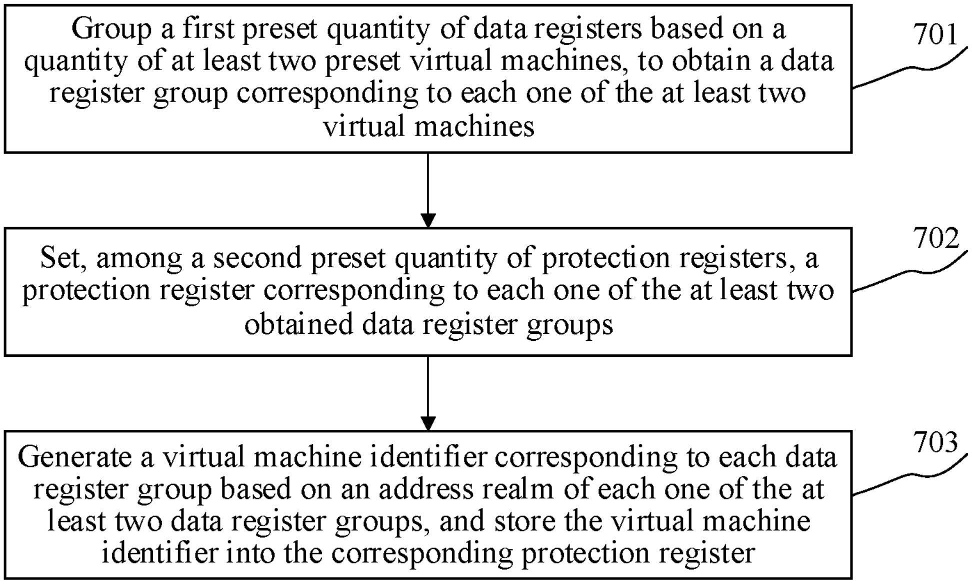
FIG. 7 is a schematic flowchart of a data register access method according to another exemplary embodiment of this disclosure.

In some optional implementations, as shown in FIG. 7, before step 201, the method further includes the following steps.

Step 701. Group a first preset quantity of data registers based on a quantity of at least two preset virtual machines, to obtain a data register group corresponding to each one of the at least two virtual machines.

A quantity of the data register groups included in the first preset quantity of data registers may be a fixed quantity that is obtained through partitioning. This quantity may be greater than or equal to the quantity of the virtual machines. The electronic device may set the data register group corresponding to each virtual machine. The quantity of the data register groups may also be the same as that of the virtual machines. To be specific, the corresponding quantity of data register groups are partitioned based on the set quantity of the virtual machines.

Step 702. Set, among a second preset quantity of protection registers, a protection register corresponding to each one of the at least two obtained data register groups.

Specifically, information about a correspondence between the address realm of each data register group and the address of the protection register may be set. For example, the information about the correspondence may include the first address of each data register group and the corresponding address offset. The protection register corresponding to each data register group may be determined based on the address offset.

Step 703. Generate a virtual machine identifier corresponding to each data register group based on an address realm of each one of the at least two data register groups, and store the virtual machine identifier into the corresponding protection register.

For example, high-bit-segment data of each address in the address realm of each data register group may be stored, as a virtual machine identifier, into the corresponding protection register. Alternatively, the virtual machine identifier corresponding to each data register group that is manually set by a user may be stored into the corresponding protection register.

Usually, during starting of the electronic device, an initialization operation is required, which includes the foregoing steps 701 to 703. It should be noted that, hardware for performing the initialization operation may be different from that for performing the foregoing embodiments corresponding to FIG. 2-FIG. 6. To be specific, the electronic device may include a first logic execution device and a second logic execution device. The first logic execution device may be a dedicated logic circuit designed through hardware description languages, and the second logic execution device may be a general-purpose processor. During starting, the electronic device is initialized by using the general-purpose processor. In other words, correspondences between the register group, the virtual machine, and the protection register are configured. Subsequently, the access permission of each virtual machine is controlled by using the dedicated logic circuit.

According to this embodiment, corresponding data register groups and protection registers are respectively predisposed for a plurality of virtual machines. In this way, isolation of data registers accessed by different virtual machines is implemented on the hardware, thereby avoiding mutual interference between different virtual machines that is caused during access of the data registers. There is no need to use complex software to manage the data registers, so that the efficiency of accessing the data register in a multi-virtual machine environment is improved.

Exemplary Apparatus

Figure 8:
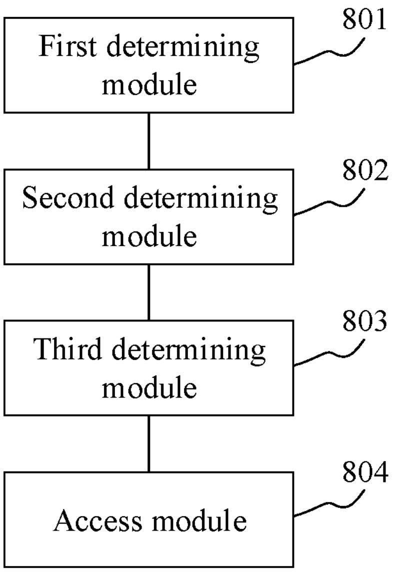
FIG. 8 is a schematic diagram of a structure of a data register access apparatus according to an exemplary embodiment of this disclosure.

FIG. 8 is a schematic diagram of a structure of a data register access apparatus according to an exemplary embodiment of this disclosure. This embodiment may be applicable to an electronic device. As shown in FIG. 8, the data register access apparatus includes: a first determining module 801, configured to determine a first virtual machine identifier and a first address of a to-be-accessed data register from a register access request generated by a target virtual machine, wherein the first address indicates a position of the to-be-accessed data register in a target data register group to which the to-be-accessed data register belongs; a second determining module 802, configured to determine, based on the first virtual machine identifier, a target data register group and a target protection register that correspond to the target virtual machine from at least two preset data register groups and a preset protection register group; a third determining module 803, configured to determine an access permission of the target virtual machine to the target data register group by using the target protection register; and an access module 804, configured to determine, based on the first address, the to-be-accessed data register from the target data register group in response to that the access permission is access allowed, and access the to-be-accessed data register by using the target virtual machine.

In this embodiment, the first determining module 801 may determine the first virtual machine identifier and the first address of the to-be-accessed data register from the register access request generated by the target virtual machine.

The register access request may be a request generated by the target virtual machine before the target virtual machine accesses the data register. Usually, the register access request needs to be generated when the target virtual machine needs to write data to or read data from the to-be-accessed data register. The first determining module 801 may extract the first virtual machine identifier (VMID) representing the target virtual machine and the first address of the to-be-accessed data register from the register access request. The first virtual machine identifier indicates a virtual machine corresponding to the target data register group to which the to-be-accessed data register belongs. To be specific, the target virtual machine needs to generate a virtual machine identifier corresponding to the target data register group before accessing the target data register group. The first determining module 801 may determine the target data register group from the at least two data register groups shown in FIG. 1 based on the first virtual machine identifier. The first virtual machine identifier may be any form of identifier; for example, it may include at least one of a number, a character, and a symbol.

The first address indicates a position of the to-be-accessed data register in the target data register group to which the to-be-accessed data register belongs. Optionally, the first address may be a relative address or an absolute address of the to-be-accessed data register. For example, if the absolute address of the to-be-accessed data register is m-bit binary data, the first address may be the m-bit binary data, or it may be n lower bits of the m-bit binary data. The n lower bits are the relative address, and a numerical range of the n lower bits corresponds to a quantity of data registers in the target data register group.

Optionally, the register access request may also include the absolute address of the to-be-accessed data register. If the absolute address is m-bit binary data, m−n higher bits thereof may be a first register identifier, and n lower bits thereof may be the above-mentioned first address. To be specific, data at the m−n higher bits corresponds to a target data register group consisting of $2^n$ data registers, and the first address is an address of the to-be-accessed data register in the $2^n$ data registers. In this way, the target data register group may be located in a first preset quantity of data registers 102 based on the first register identifier, and the to-be-accessed data register may be located in the target data register group based on the first address.

In this embodiment, the second determining module 802 may determine, based on the first virtual machine identifier, the target data register group and the target protection register that correspond to the target virtual machine from the at least two preset data register groups and the preset protection register group. The protection register group may be a register group consisting of at least two protection registers in the second preset quantity of protection registers shown in FIG. 1.

Each protection register in the protection register group corresponds to a data register group; that is, it corresponds to a virtual machine. A correspondence between each protection register in the protection register group and the data register group may be pre-established. For example, if addresses of the first preset quantity of data registers 102 and the second preset quantity of protection registers shown in FIG. 1 are arranged consecutively, an address offset corresponding to each data register group may be set sequentially based on an arrangement order of all the data register groups. The corresponding protection register may be determined based on the address offset. For another example, a correspondence table containing a first address of the data register group, an address of the corresponding protection register, and the virtual machine identifier may be pre-established. The target data register group and the target protection register that correspond to the target virtual machine may be determined according to the correspondence table.

In this embodiment, the third determining module 803 may determine the access permission of the target virtual machine to the target data register group by using the target protection register. The target protection register may store data representing the access permission of the target virtual machine to the target data register group.

For example, the target protection register may store a virtual machine identifier. If the virtual machine identifier is the same as the foregoing first virtual machine identifier, it is determined that the target virtual machine has the access permission to the target data register group. For another example, the target protection register may store address data representing an address realm of the target data register group (such as high-bit-segment data of an address of each data register in the target data register group, where a quantity of bits in the high-bit-segment data is a preset value). When it is determined that an address of a data register to be accessed by the target virtual machine belongs to the address realm represented by the address data stored in the target protection register, it is determined that the target virtual machine has the access permission to the target data register group.

Optionally, after it is determined that the target virtual machine has the access permission to the target data register group, the third determining module 803 may send an enable signal to the target data register group, so that a data read/write function of a target data register is enabled.

In this embodiment, the access module 804 may determine, based on the first address, the to-be-accessed data register from the target data register group in response to that the access permission is access allowed.

The first address may be a relative address of the to-be-accessed register in the target data register group. The to-be-accessed register may be located in the target data register group based on the relative address. For example, the first address may be an ID from 0 to A-1, where A represents a quantity of data registers included in the target data register group.

Subsequently, the access module 804 may access the to-be-accessed data register by using the target virtual machine. In other words, when running software, the target virtual machine performs a data read/write operation on the to-be-accessed data register.

Figure 9:
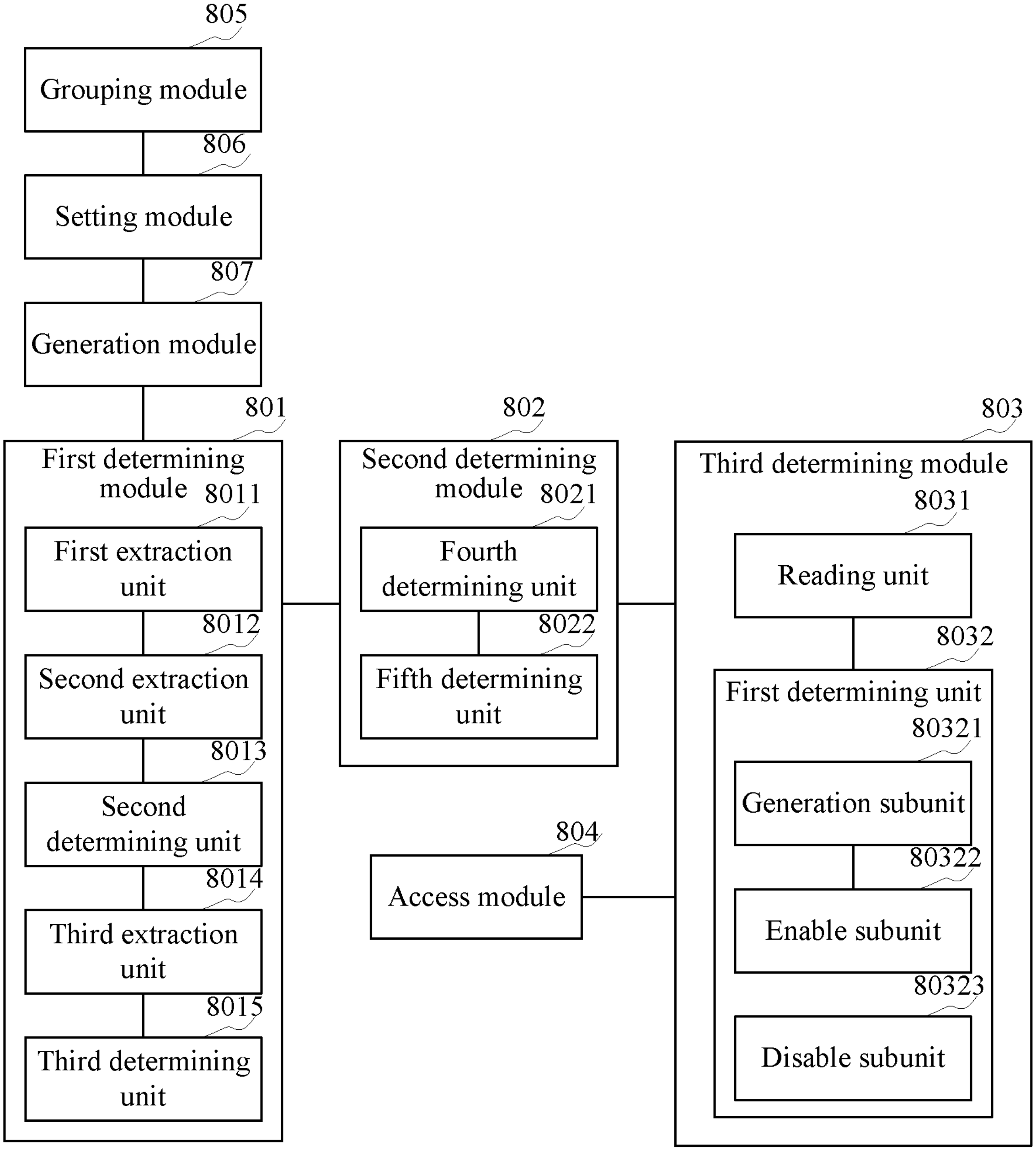
FIG. 9 is a schematic diagram of a structure of a data register access apparatus according to another exemplary embodiment of this disclosure.

Referring to FIG. 9, FIG. 9 is a schematic diagram of a structure of a data register access apparatus according to another exemplary embodiment of this disclosure.

In some optional implementations, the third determining module 803 includes: a reading unit 8031, configured to obtain a pre-stored second virtual machine identifier from the target protection register; and a first determining unit 8032, configured to determine the access permission of the target virtual machine to the target data register group based on the first virtual machine identifier and the second virtual machine identifier.

In some optional implementations, the first determining unit 8032 includes: a generation subunit 80321, configured to generate an enable signal based on the first virtual machine identifier and the second virtual machine identifier; and an enable subunit 80322, configured to enable the access permission of the target virtual machine to the target data register group based on the enable signal.

In some optional implementations, the first determining module 801 includes: a first extraction unit 8011, configured to extract a second address of the to-be-accessed data register from the register access request; a second extraction unit 8012, configured to extract first bit-segment data from the second address; a second determining unit 8013, configured to determine the first virtual machine identifier based on the first bit-segment data; a third extraction unit 8014, configured to extract second bit-segment data from the second address; and a third determining unit 8015, configured to determine the first address of the to-be-accessed data register based on the second bit-segment data.

In some optional implementations, the first determining unit 8032 includes: a disable subunit 80323, configured to generate a disable signal in response to determining that the first virtual machine identifier and the second virtual machine identifier do not meet an authorization condition, and disable the access permission of the target virtual machine to the target data register group based on the disable signal.

In some optional implementations, the second determining module 802 includes: a fourth determining unit 8021, configured to determine, based on the first virtual machine identifier, the target data register group from the at least two data register groups, and determine an address offset between the target data register group and the target protection register; and a fifth determining unit 8022, configured to determine the target protection register from the protection register group based on the address offset.

In some optional implementations, the apparatus further includes: a grouping module 805, configured to group a first preset quantity of data registers based on a quantity of at least two preset virtual machines, to obtain a data register group corresponding to each one of the at least two virtual machines; a setting module 806, configured to set, among a second preset quantity of protection registers, a protection register corresponding to each one of the at least two obtained data register groups; and a generation module 807, configured to generate a virtual machine identifier corresponding to each data register group based on an address realm of each one of the at least two data register groups, and store the virtual machine identifier into the corresponding protection register.

According to the data register access apparatus provided in the foregoing embodiments of this disclosure, a dedicated target data register group is disposed for the target virtual machine, and the access permission of the target virtual machine to the target data register group is controlled by using the target protection register, so that the target virtual machine can access only the corresponding target data register group. In this way, different virtual machines may be flexibly controlled to access respective corresponding data register groups. Isolation between register groups is implemented on hardware, without setting a complex software program to control the access permission of the virtual machine to the register, so that efficiency of accessing the register by the virtual machine is improved.

Exemplary Electronic Device

An embodiment of this disclosure further provides an electronic device. The electronic device includes a logic execution device 101, a first preset quantity of data registers 102, a second preset quantity of protection registers 103, and an instruction memory 104 shown in FIG. 1. For functions of the logic execution device 101, the first preset quantity of data registers 102, the second preset quantity of protection registers 103, and the instruction memory 104, reference may be made to the foregoing description of the exemplary architecture shown in FIG. 1, and details are not described herein.

In addition, the electronic device may also include an input device, an output device, and a necessary memory. The input devices may include a mouse, a keyboard, a touch screen, a communication network connector, and the like, to input various commands. The output device may include, for example, a display, a printer, a communication network, and a remote output device connected by the communication network, to output various data. The memory is configured to store data input by the input device, and data generated during operation of the electronic device. The memory may include a volatile memory and/or a non-volatile memory. The volatile memory may include, for example, a random access memory (RAM) and/or a cache. The nonvolatile memory may include, for example, a read-only memory (ROM), a hard disk, and a flash memory.

Exemplary Computer Program Product and Computer Readable Storage Medium

In addition to the foregoing method and device, embodiments of this disclosure may also relate to a computer program product, which includes computer program instructions. When the computer program instructions are run by a logic execution device 101 shown in FIG. 1, the logic execution device 101 is enabled to perform the steps, of the data register access method according to the embodiments of this disclosure, that are described in the "exemplary method" section of this specification.

The computer program product may be program code, written with one or any combination of a plurality of programming languages, that is configured to perform the operations in the embodiments of this disclosure. The programming languages include an object-oriented programming language such as Java or C++, and further include a conventional procedural programming language such as a "C" language or a similar programming language. The program code may be entirely or partially executed on a user computing device, executed as an independent software package, partially executed on the user computing device and partially executed on a remote computing device, or entirely executed on the remote computing device or a server.

In addition, the embodiments of this disclosure may further relate to a computer readable storage medium, which stores computer program instructions. When the computer program instructions are run by a logic execution device 101, the logic execution device 101 is enabled to perform the steps, of the data register access method according to the embodiments of this disclosure, that are described in the "exemplary method" part of this specification.

The computer readable storage medium may be one readable medium or any combination of a plurality of readable media. The readable medium may be a readable signal medium or a readable storage medium. The readable storage medium may include, for example, but is not limited to a system, an apparatus, or a device of electricity, magnetism, light, electromagnetism, infrared ray or semiconductor, or any combination of the above. More specific examples (a non-exhaustive list) of the readable storage medium include: an electrical connection with one or more conducting wires, a portable disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination of the above.

Basic principles of this disclosure are described above in combination with specific embodiments. However, advantages, superiorities, and effects mentioned in this disclosure are merely examples but are not for limitation, and it cannot be considered that these advantages, superiorities, and effects are necessary for each embodiment of this disclosure. In addition, specific details described above are merely for examples and for ease of understanding, rather than limitations. The details described above do not limit that this disclosure must be implemented by using the foregoing specific details.

A person skilled in the art may make various modifications and variations to this disclosure without departing from the spirit and the scope of this application. In this way, if these modifications and variations of this application fall within the scope of the claims and equivalent technologies of the claims of this disclosure, this disclosure also intends to include these modifications and variations.

What is claimed is:

1. A data register access method, comprising:

generating a virtual machine identifier corresponding to each data register group of at least two data register groups based on an address realm of the each data register group, and storing the virtual machine identifier into a protection register corresponding to the each data register group, wherein the each data register group corresponds to a virtual machine;

determining a first virtual machine identifier and a first address of a to-be-accessed data register from a register access request generated by a target virtual machine, wherein the first address indicates a position of the to-be-accessed data register in a target data register group to which the to-be-accessed data register belongs, and the to-be-accessed data register is a data register to be accessed;

determining, based on the first virtual machine identifier, a target data register group and a target protection register that correspond to the target virtual machine from the at least two data register groups and a preset protection register group;

determining an access permission of the target virtual machine to the target data register group by using a second virtual machine identifier stored in the target protection register; and determining, based on the first address, the to-be-accessed data register from the target data register group that corresponds to the target virtual machine in response to that the access permission is access allowed, and accessing the to-be-accessed data register by using the target virtual machine.

2. The method according to claim 1, wherein the determining an access permission of the target virtual machine to the target data register group by using a second virtual machine identifier stored in the target protection register comprises:

obtaining the second virtual machine identifier stored in the target protection register; and determining the access permission of the target virtual machine to the target data register group based on the first virtual machine identifier and the second virtual machine identifier.

3. The method according to claim 2, wherein the determining the access permission of the target virtual machine to the target data register group based on the first virtual machine identifier and the second virtual machine identifier comprises:

generating an enable signal based on the first virtual machine identifier and the second virtual machine identifier; and enabling the access permission of the target virtual machine to the target data register group based on the enable signal.

4. The method according to claim 2, wherein the determining the access permission of the target virtual machine to the target data register group based on the first virtual machine identifier and the second virtual machine identifier comprises:

generating a disable signal in response to determining that the first virtual machine identifier and the second virtual machine identifier do not meet an authorization condition, and disabling the access permission of the target virtual machine to the target data register group based on the disable signal.

5. The method according to claim 1, wherein the determining a first virtual machine identifier and a first address of a to-be-accessed data register from a register access request generated by a target virtual machine comprises:

extracting a second address of the to-be-accessed data register from the register access request;

extracting first bit-segment data from the second address;

determining the first virtual machine identifier based on the first bit-segment data;

extracting second bit-segment data from the second address; and determining the first address of the to-be-accessed data register based on the second bit-segment data.

6. The method according to claim 1, wherein the determining, based on the first virtual machine identifier, a target data register group and a target protection register that correspond to the target virtual machine from the at least two data register groups and a preset protection register group comprises:

determining, based on the first virtual machine identifier, the target data register group from the at least two data register groups, and determining an address offset between the target data register group and the target protection register; and determining the target protection register from the protection register group based on the address offset.

7. The method according to claim 1, further comprising: before the generating a virtual machine identifier corresponding to each data register group of at least two data register groups based on an address realm of the each data register group, and storing the virtual machine identifier into a protection register corresponding to the each data register group, grouping a first preset quantity of data registers based on a quantity of at least two preset virtual machines, to obtain a data register group corresponding to each one of the at least two virtual machines; and setting, among a second preset quantity of protection registers, a protection register corresponding to each one of the at least two obtained data register groups.

8. A non-transitory computer readable storage medium, wherein the storage medium stores a computer program, and the computer program is used to be executed by a logic execution device to implement a data register access method, wherein the data register access method comprises:

generating a virtual machine identifier corresponding to each data register group of at least two data register groups based on an address realm of the each data register group, and storing the virtual machine identifier into a protection register corresponding to the each data register group, wherein the each data register group corresponds to a virtual machine;

determining a first virtual machine identifier and a first address of a to-be-accessed data register from a register access request generated by a target virtual machine, wherein the first address indicates a position of the to-be-accessed data register in a target data register group to which the to-be-accessed data register belongs, and the to-be-accessed data register is a data register to be accessed;

determining, based on the first virtual machine identifier, a target data register group and a target protection register that correspond to the target virtual machine from the at least two data register groups and a preset protection register group;

determining an access permission of the target virtual machine to the target data register group by using a second virtual machine identifier stored in the target protection register; and determining, based on the first address, the to-be-accessed data register from the target data register group that corresponds to the target virtual machine in response to that the access permission is access allowed, and accessing the to-be-accessed data register by using the target virtual machine.

9. The non-transitory computer readable storage medium according to claim 8, wherein the determining an access permission of the target virtual machine to the target data register group by using a second virtual machine identifier stored in the target protection register comprises:

obtaining the second virtual machine identifier stored in the target protection register; and determining the access permission of the target virtual machine to the target data register group based on the first virtual machine identifier and the second virtual machine identifier.

10. The non-transitory computer readable storage medium according to claim 9, wherein the determining the access permission of the target virtual machine to the target data register group based on the first virtual machine identifier and the second virtual machine identifier comprises:

generating an enable signal based on the first virtual machine identifier and the second virtual machine identifier; and enabling the access permission of the target virtual machine to the target data register group based on the enable signal.

11. The non-transitory computer readable storage medium according to claim 9, wherein the determining the access permission of the target virtual machine to the target data register group based on the first virtual machine identifier and the second virtual machine identifier comprises:

generating a disable signal in response to determining that the first virtual machine identifier and the second virtual machine identifier do not meet an authorization condition, and disabling the access permission of the target virtual machine to the target data register group based on the disable signal.

12. The non-transitory computer readable storage medium according to claim 8, wherein the determining a first virtual machine identifier and a first address of a to-be-accessed data register from a register access request generated by a target virtual machine comprises:

extracting a second address of the to-be-accessed data register from the register access request;

extracting first bit-segment data from the second address;

determining the first virtual machine identifier based on the first bit-segment data;

extracting second bit-segment data from the second address; and determining the first address of the to-be-accessed data register based on the second bit-segment data.

13. The non-transitory computer readable storage medium according to claim 8, wherein the determining, based on the first virtual machine identifier, a target data register group and a target protection register that correspond to the target virtual machine from the at least two data register groups and a preset protection register group comprises:

determining, based on the first virtual machine identifier, the target data register group from the at least two data register groups, and determining an address offset between the target data register group and the target protection register; and determining the target protection register from the protection register group based on the address offset.

14. The non-transitory computer readable storage medium according to claim 8, wherein the method further comprises: before the generating a virtual machine identifier corresponding to each data register group of at least two data register groups based on an address realm of the each data register group, and storing the virtual machine identifier into a protection register corresponding to the each data register group, grouping a first preset quantity of data registers based on a quantity of at least two preset virtual machines, to obtain a data register group corresponding to each one of the at least two virtual machines; and setting, among a second preset quantity of protection registers, a protection register corresponding to each one of the at least two obtained data register groups.

15. An electronic device, wherein the electronic device comprises a logic execution device, a first preset quantity of data registers, a second preset quantity of protection registers, and an instruction memory;

the instruction memory is configured to store executable instructions which are executable by the logic execution device; and the logic execution device is configured to read the executable instructions from the instruction memory, and execute the instructions to implement a data register access method, wherein the data register access method comprises:

generating a virtual machine identifier corresponding to each data register group of at least two data register groups based on an address realm of the each data register group, and storing the virtual machine identifier into a protection register corresponding to the each data register group, wherein the each data register group corresponds to a virtual machine;

determining a first virtual machine identifier and a first address of a to-be-accessed data register from a register access request generated by a target virtual machine, wherein the first address indicates a position of the to-be-accessed data register in a target data register group to which the to-be-accessed data register belongs, and the to-be-accessed data register is a data register to be accessed;

determining, based on the first virtual machine identifier, a target data register group and a target protection register that correspond to the target virtual machine from the at least two data register groups and a preset protection register group;

determining an access permission of the target virtual machine to the target data register group by using a second virtual machine identifier stored in the target protection register; and determining, based on the first address, the to-be-accessed data register from the target data register group that corresponds to the target virtual machine in response to that the access permission is access allowed, and accessing the to-be-accessed data register by using the target virtual machine.

16. The electronic device according to claim 15, wherein the determining an access permission of the target virtual machine to the target data register group by using a second virtual machine identifier stored in the target protection register comprises:

obtaining the second virtual machine identifier stored in the target protection register; and determining the access permission of the target virtual machine to the target data register group based on the first virtual machine identifier and the second virtual machine identifier.

17. The electronic device according to claim 16, wherein the determining the access permission of the target virtual machine to the target data register group based on the first virtual machine identifier and the second virtual machine identifier comprises:

generating an enable signal based on the first virtual machine identifier and the second virtual machine identifier; and enabling the access permission of the target virtual machine to the target data register group based on the enable signal.

18. The electronic device according to claim 16, wherein the determining the access permission of the target virtual machine to the target data register group based on the first virtual machine identifier and the second virtual machine identifier comprises:

generating a disable signal in response to determining that the first virtual machine identifier and the second virtual machine identifier do not meet an authorization condition, and disabling the access permission of the target virtual machine to the target data register group based on the disable signal.

19. The electronic device according to claim 15, wherein the determining a first virtual machine identifier and a first address of a to-be-accessed data register from a register access request generated by a target virtual machine comprises:

extracting a second address of the to-be-accessed data register from the register access request;

extracting first bit-segment data from the second address;

determining the first virtual machine identifier based on the first bit-segment data;

extracting second bit-segment data from the second address; and determining the first address of the to-be-accessed data register based on the second bit-segment data.

20. The electronic device according to claim 15, wherein the determining, based on the first virtual machine identifier, a target data register group and a target protection register that correspond to the target virtual machine from the at least two data register groups and a preset protection register group comprises:

determining, based on the first virtual machine identifier, the target data register group from the at least two data register groups, and determining an address offset between the target data register group and the target protection register; and determining the target protection register from the protection register group based on the address offset.

* * * * *